United States Patent [19]
Yamada

[11] 3,757,765
[45] Sept. 11, 1973

[54] GRILLER
[76] Inventor: Eiichi Yamada, 3-9 Yotsuya, Shinjuku-ku, Tokyo, Japan
[22] Filed: Dec. 16, 1971
[21] Appl. No.: 208,702

[52] U.S. Cl. .............................. 126/41 R
[51] Int. Cl. ........................... A47j 37/04
[58] Field of Search ................. 126/41, 25; 99/390

[56] References Cited
UNITED STATES PATENTS
3,413,912  12/1968  Phelan et al. ............... 126/41 X
3,267,924   8/1966  Payne ........................... 126/41
2,441,190   5/1948  Fuller .......................... 126/25

*Primary Examiner*—Edward G. Favors
*Attorney*—Albert H. Oldham, Vera L. Oldham et al.

[57] ABSTRACT

A griller adapted to roast skewered fish, meat and the like that are laid on between loading plates made at ends of an opening part which is formed at the upper part of the case of the griller, with use of heat sources positioned respectively outwardly of vertical lines dropped from the opening part in such a way as to point to the said opening part.

7 Claims, 4 Drawing Figures

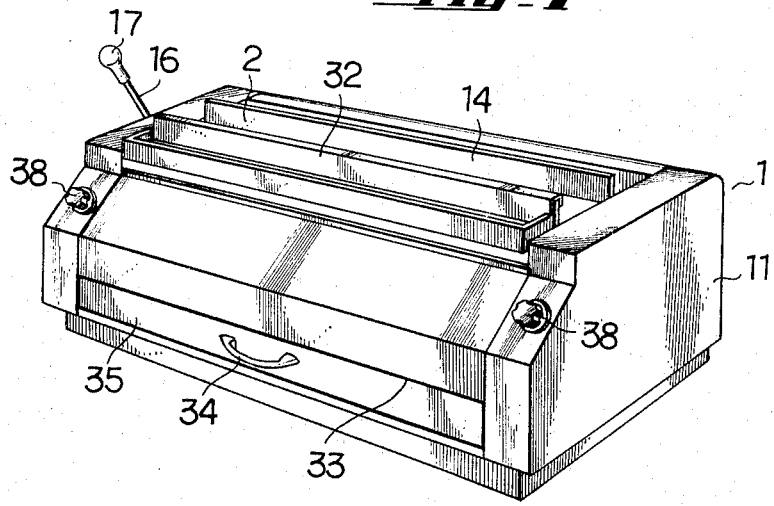
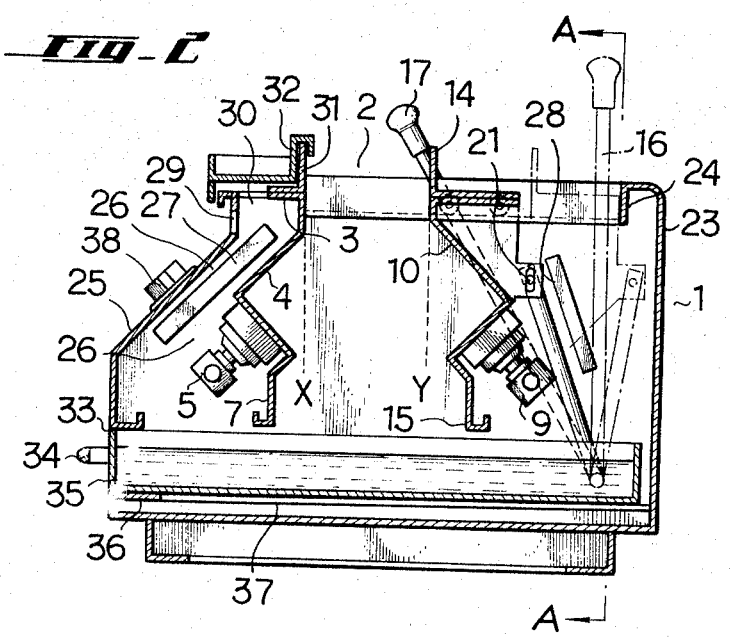

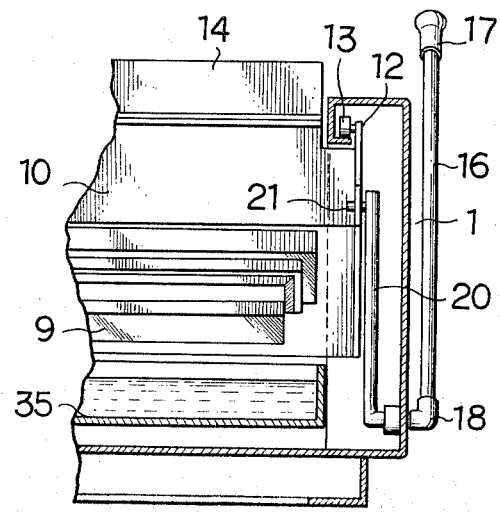
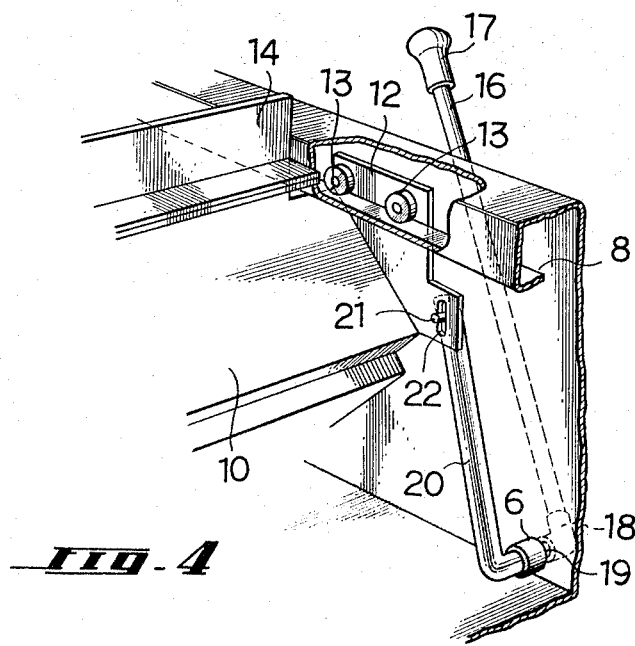

GRILLER

BRIEF SUMMARY OF THE INVENTION

This invention relates to a griller for roasting meat, fish and the like. Conventionally, a griller has been used as an appliance for roasting meat, fish and the like. But in conventional grillers, the upper part thereof is open, directly whereunder a heating body, such as gas burners and the like, is positioned, and which meat or fish is put on a metallic net or iron plate or is otherwise positioned to be grilled or roasted by the heat of the gas burner.

Therefore, water, oil, grease and the like oozing from the meat, fish and the like normally drops on the heating body situated directly thereunder to burn or evaporate them, resulting in creating a great deal of smoke, flame, and vapor and in polluting, in case for indoor, not only the air in the room but also the whole room by the smoke and vapor.

So, in order to rectify these defects, there has been provided a griller which makes the said water, oil, grease and the like not drop on the heating body by covering it with heat-resistant glass for receiving the foods, but in this case, defects were found such as having to do the cleaning of the glass as well as decrease in the heat efficiency and/or frequently the glass may crack or produce other problems.

One object of this invention is to provide a griller having an extremely good heat efficiency and allowing water, grease and oil from the food not to drop on the heating body contained therein.

And in a conventional griller, a heating chamber has been formed by the heating body equipped under the case whereof and by the side wall of the case, which causes the heat of the heating chamber to heat the case itself, resulting in lowering of heat efficiency owing to loss of heat to be used for the thing grilled or roasted, and moreover, a man working near the case having been unable to continue work for suffering a pain by the heat, sometimes has had the experience of burns by contacting with the case.

Another object of this invention is to permit only a small quantity of heat to be conducted to the case as well as to remove the possibility of burns from the case and to concentrate efficiently the heat at the opening part without the heat being taken up by the case itself. And a further object of this invention is to obtain a griller with the opening part thereof changeable suitably in width, thereby enabling the griller to be used for various purposes.

BRIEF DESCRIPTION OF DRAWINGS

FIG. 1 is a perspective view of an illustrative embodiment of this invention;

FIG. 2 is a central vertical section of FIG. 1;

FIG. 3 is a vertical section view at A—A line of FIG. 2; and

FIG. 4 is a fragmentary perspective view of the operating part with a handle in FIG. 1.

DETAILED DESCRIPTION OF INVENTION

Referring now to the drawings, there is illustrated a description on a recommendable embodiment of this invention.

The numeral 1 indicates a case, formed of metallic, thin plate like stainless steel, nearly all over the upper surface whereof an opening part is made. There is vertically dropped from the brim of an oven plate 3 facing the said opening part a reflecting plate 4, at the lower part whereof a heating infra-red gas burner 5 is positioned forwardly of a vertical line or plane X dropped from the edge of the oven plate 3 facing the opening part, with the lower part thereof being secured to a sustaining plate 7 fixed to the side wall of the case 1. The said reflecting plate 4 is shaped to extend obliquely forwardly and connects the upper part of the infra-red ray gas burner to the brim of the oven plate 3 so as to correspond to the heat emitting direction of the infra-red gas burner 5. 8,8 indicate guide rails formed in a letter "L" shape by beinding respectively the upper ends of the right and the left side walls of the case 1. Said guide rails 8,8 are made to sustain wheels 13,13 put thereon which are suitably secured to sustaining plates 12,12, to which a reflecting plate 10 positioning an infra-red ray gas burner 9 is secured. The reflecting plate 10 is contoured oppositely to the plate 4.

Guide rails 8, 8 may be formed by projecting a piece of the plate inward of the side walls 11, 11 at their upper ends. The said infra-red ray gas burner 9 is positioned on the outer or rear side of a vertical line or plane Y dropped from the brim of a loading or support plate 14 which is provided at the upper end of the reflecting plate 10. The plate 14 is of the form of the letter L. The gas burner 9 is positioned to point obliquely upwardly toward the opening 2. At the lower part of the burner support a screening plate 15 extends vertically downwardly.

The reflecting plate 10 is obliquely positioned and connects the upper end of the infra-red ray gas burner 9 to the brim of the loading plate 14 so as to correspond to the heat-emitting direction of the gas burner 9.

Numeral 16 indicates a handle with a knob 17 and an elbow 18 is provided at the lower end of the handle, and a connecting rod 20 passes through a hole 19 made in the side wall 11 of the case 1 to connect to the elbow 18. The rod is loosely held in the side wall 11 of the case 1 between a bushing 6 fixedly fitted on the connecting rod 20 and the elbow, thereby the handle 16 and the connecting rod 20 are united and sustained in a freely movable way by the shape of the hole 19. The connecting rod 20 is formed, for example, nearly in the shape of the letter L, having at the upper end thereof a pin 21 projectively extending therefrom. The pin is movably engaged in an oblong hole 22 made in one of the sustaining plates 12. Thus by turning the handle 16 through an arc the wheels 13, 13 are moved on the guide rails 8, the reflecting plate 10 positioning the infra-red ray gas burner 9 is moved to the right or the left (FIG. 2) to vary the size of the opening 2. The connecting rod 20 being, as shown in FIG. 4, connected to one of the sustaining plates 12 through the pin 21, it or the pin 21 may be made to movably insert into an oblong hole 22 formed on both of the sustaining plates 12, 12 by extending it or the pin 12 to the other sustaining plate 12 is desired.

The turnable angle range of the handle 16 corresponds to the moving distance by wheels 13, on the sustaining plates 12 which are controlled and determined respectively at the rear end thereof by hitting against the folded end 24 of the back wall 23 of the case 1 and at the front way by being restricted by the movement of the pin 21 within the oblong hole 22, but it may be equipped with a stopper-like projection on the respective guide rails 8, 8 thereby to obstruct the movement of the sustaining plates 12, 12 The case 1 has therein the reflecting plate 4 positioned at a suitable interval to the front plate and a ventilating space 26 formed between them. Adiabatic materials, for example, like asbestoes 27, 28 or other insulating means are pasted to or suitably positioned spaced from the backs of the reflecting plates 4, 10, respectively.

Oblong interstices are formed in or above the front plate 25 and oven plate 3 respectively as ventilating holes 29, 30 and may be replaced by many circular holes or by only one ventilating hole without forming a hole 30. Numeral 30 indicates a loading plate which is fixedly secured to the oven plate 3 and formed to the same height as that of the loading plate 14 described above.

Numeral 32 indicates a water basin or shield positioned by hanging the projective part thereof on the loading plate 14, but the said basin may be omitted if desired. Numeral 33 indicates a opening which is formed in the front side plate 25 of the case 1 and has a knob 34 secured to a slidable receiving tray 35 for collecting water or liquids by means of guides 37, 37 secured to the folded brim 36 at the opening and to the side walls 11, 11

The said receiving tray 35 is positioned adjacent the lower ends of the sustaining plate 7 and of the screening plate 15. 38, 38 indicate conventional gas cocks equipped with ignition devices operatively connected to the gas burners. Now, if an explanation is to be made on a mean for using and the action of this invention, it as follows; by opening gas cocks 38, 38 equipped with ignition devices, infra-red ray gas burners 5, 9 are ignited and heat emitted from the infra-red ray bas burners 5,9 is released and directed to reach directly the opening part 2, or the heat which is diffused up and down in the heat-emitting direction is reflected by reflecting plates 4, 10 with a part thereof rising along reflecting plates 4, 10 and the other part rising with heating the air at the lower part of the opening part 2, causing both of them to concentrate heat at the opening part 2 at any rate. Thereof, fish, vegetable and the like on skewers hung between the loading plates 31, 14 or otherwise supported thereon can be roasted, grilled, or broiled and fat, water, grease and the like dripped therefrom drops into the receiving tray 35 without touching the infra-red ray gas burners 5, 9, hence generating no smoke, thereby resulting in enabling one to barbecue even inside as well as outside the building.

When a wide opening part is needed according to the largeness of the barcecue, or as in the case of using an iron plate to support meat, or food by turning the handle 16 by the knob 17 wheels 13, 13 begin to roll on the guide rails 8, 8 to move the reflecting plate 10 and the infra-red ray gas burner 9, causing to widen the opening 2. And moreover, even when heated, the reflecting plate 4, which is positioned at a suitable interval to the front plate 25 and the heat being screened by a layer of asbestoes 27 and the ventilating hole 26 being provided, therefore, the heat is released outside by way of the said ventilating part 26 and the ventilating holes 29 or 30, causing no undesirable heating of the front plate 25. Thereby the operator will not be burned nor to work in the heated air.

An explanation has been made on a griller, wherein one 9 of the infra-red ray gas burners 9, 5 moves simultaneously when the opening 2 widens or narrows has been made. However, if the size of the opening 2 is not to be changed, a griller having the loading plate 14, the reflecting plate 10 and the screening plate 15 under the infra-red ray gas burner fixed to the side walls 11, 11 of the case 1 can also be used.

The various parts of the griller can be secured together or engaged together in any suitable manner. A conventional gas supply means (not shown) connects to the gas cocks 38.

Other heating units than the gas burners can be used if desired.

The gas cocks 38 suitably connect to the gas burners.

While one complete embodiment of the invention has been disclosed herein, it will be appreciated that modification of this particular embodiment of the invention may be resorted to without departing from the scope of the invention.

What is claimed is:

1. A griller comprising, in combination, a case having a top opening, of a suitable width formed therein, and two heating units, one heating unit being positioned at the outer side of a vertical line dropped from the brim of one edge of the said opening and being under one side of the said opening and the other heating unit being positioned on a loading and a reflecting plate means under the other side of the opening means movably positioned said plate means, and a control handle operatively connecting to said plate means so as to move said plate means by the turning of said handle, the said other heating unit being positioned at the outer side of the vertical line dropped from the top end of the plate means so as to point at the opening.

2. A griller as set forth in claim 1 wherein a reflecting plate having an adiabatic material at the back thereof, with a suitable space formed between a front plate of the case and the reflecting plate, and a ventilating part formed with a ventilating hole at the upper part of the front side plate.

3. A griller as set forth in claim 1 where said other heating unit is movable forwardly and rearwardly of said case to adjust the size of said opening and food to be cooked can be positioned at said opening.

4. A griller as in claim 1 including reflecting plates directing heat from the heating units towards said opening.

5. A griller comprising, in combination, a case having a top opening of a suitable width formed therein, and two heating units, one heating unit being positioned at the outer side of a vertical line dropped from the brim of one edge of the said opening and being under one side of the said opening and the other heating unit being positioned on a loading and a reflecting plate means under the other side of the opening means movably positioning said plate means for adjustment in the spacing of the heating units, the said other heating unit being positioned at the outer side of the vertical line dropped from the other edge of said opening and positioned so as to point at the opening.

6. A griller as set forth in claim 5 wherein a reflecting plate is adjacent the above each said heating unit to direct heat toward said opening and food to be cooked can be positioned at said opening.

7. A griller as in claim 5 where food to be cooked is positioned at said opening and materials dropping from the food do not contact said heating units.

* * * * *

UNITED STATES PATENT OFFICE
CERTIFICATE OF CORRECTION

Patent No. 3,757,765          Dated September 11, 1973

Inventor(s) Eiichi Yamada

It is certified that error appears in the above-identified patent and that said Letters Patent are hereby corrected as shown below:

Column 1, line 26, after "as" (second occurrence), insert -- a --;

Column 2, line 1, after "part", add -- 2 --;

line 4, after "infra-red", insert -- ray --;

line 12, after "infra-red", insert -- ray --;

line 60, change "is" to -- if --;

Column 3, line 2, after "12, 12" add -- . --;

line 42, change "Thereof" to -- Therefore --;

line 51, change "barcecue" to -- barbecue --;

Column 4, line 27, change "positioned" to -- positioning --;

line 61, change "the" to -- and --.

Signed and sealed this 19th day of March 1974.

(SEAL)
Attest:

EDWARD M. FLETCHER, JR.        C. MARSHALL DANN
Attesting Officer              Commissioner of Patents